MULTIPLE ITEM DETECTOR FOR DOCUMENT HANDLING MACHINES
Filed Oct. 24, 1958
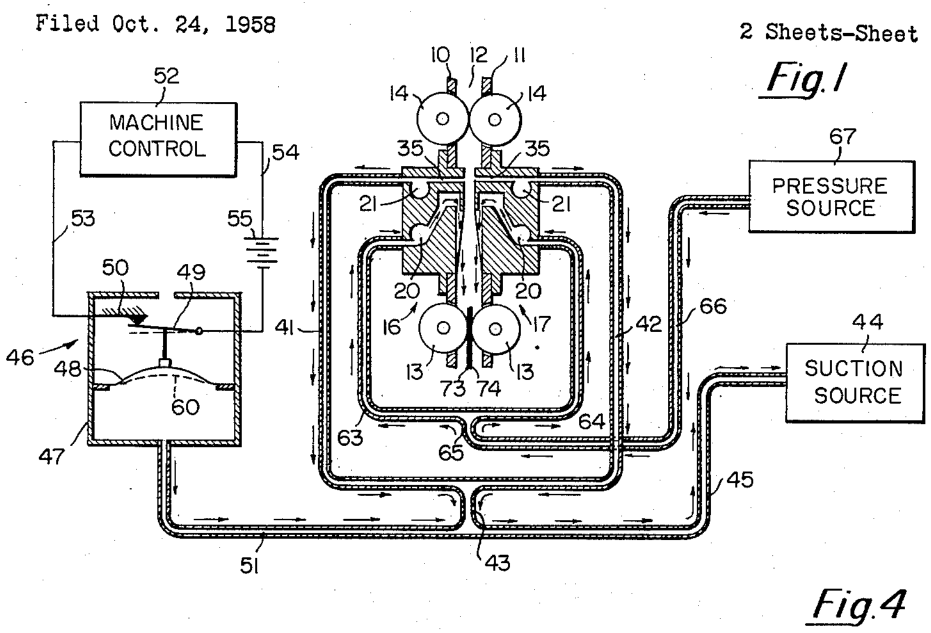
Fig. 4
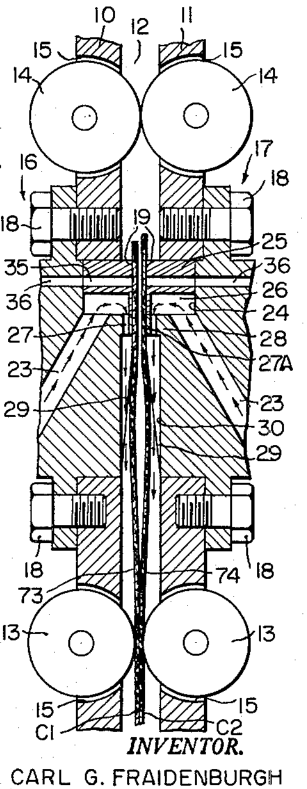
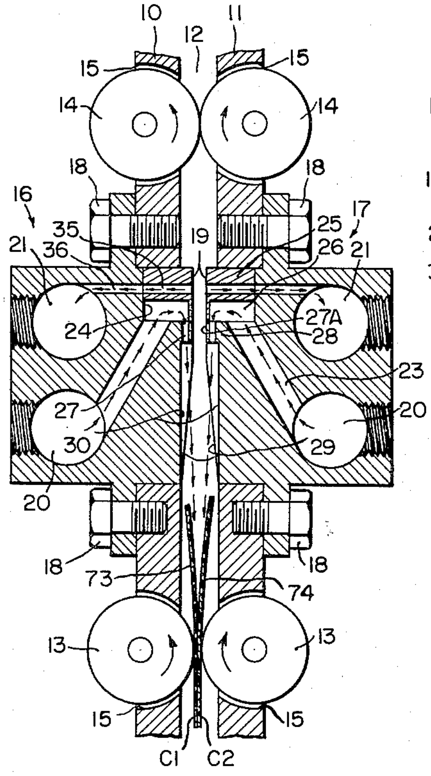
Fig. 2
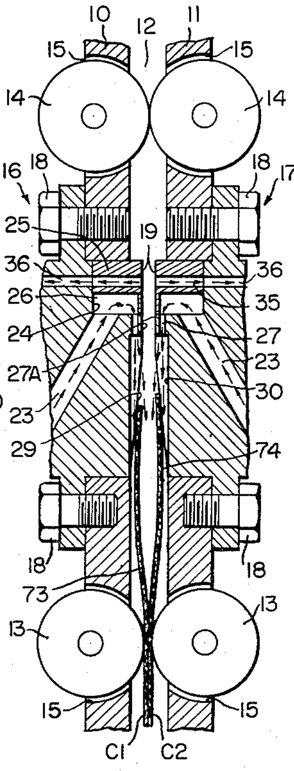
Fig. 3
INVENTOR.
CARL G. FRAIDENBURGH
BY
William R. Nolte
AGENT July 18, 1961 C. G. FRAIDENBURGH 2,992,822

MULTIPLE ITEM DETECTOR FOR DOCUMENT HANDLING MACHINES

Filed Oct. 24, 1958 2 Sheets-Sheet 2

INVENTOR.
CARL G. FRAIDENBURGH

BY

William R. Nolte

AGENT 2,992,822

MULTIPLE ITEM DETECTOR FOR DOCUMENT HANDLING MACHINES

Carl G. Fraidenburgh, Royal Oak, Mich., assignor to Burroughs Corporation, Detroit, Mich., a corporation of Michigan Filed Oct. 24, 1958, Ser. No. 769,327
10 Claims. (Cl. 271—57)

This invention relates to multiple item detecting devices and more particularly to apparatus for detecting the presence of more than one document in document handling machines.

In document handling machines, such as high speed bank check sorters, coded checks are fed sequentially one at a time from a stack and are passed through a reading device and into selected ones of a plurality of storage bins. Occasionally in machines of this type more than one check is fed simultaneously from the feeding station and means must be provided to detect such multiple feeding so that the machine output will be without error.

The important object of the present invention is to provide an improved apparatus for detecting such multiple feeding of documents through a document handling machine.

Broadly in accordance with the above object and first briefly described, the invention comprises means for advancing record documents through a guideway wherein means is provided to separate multiple documents being fed simultaneously in a manner causing the said documents to follow separated paths in the guideway to effect operation of suitable means indicative of the presence of such overlapping documents.

The invention may be more fully understood by referring to the accompanying drawings which illustrate a preferred arrangement in which:

FIG. 1 is a schematic view partially in section of the detecting apparatus;

FIGS. 2, 3 and 4 are enlarged sectional views showing various stages of movement of a pair of checks through the apparatus shown in FIG. 1;

Figure 5:
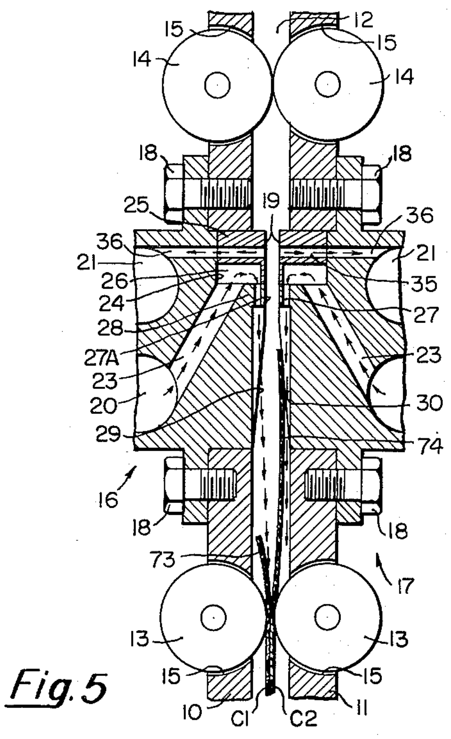
FIGS. 5 and 6 are views similar to FIGS. 2, 3 and 4 showing various stages of movement of a different pair of checks advancing through the apparatus.

Briefly described the illustrated embodiment of the invention comprises means for advancing record documents, such as bank checks, through a guideway toward streams of air flowing into the guideway in a direction counter to the direction of feed of the documents. When multiple documents are travelling through the guideway in overlapped relation, the oppositely flowing air operates to separate the advancing leading edges of the moving documents causing the documents to block suction ports on each side of the guideway, thus to effect operation of electrical circuitry indicative of the presence of overlapped documents.

The illustrated embodiment of the invention hereinafter described in detail is embodied in a check sorting machine which for clarity of illustration is only partially shown. The device, as seen in FIG. 2, includes a pair of plates 10 and 11 arranged in spaced parallel relation with each other to form a check transporting channel 12. Pairs of rollers 13 and 14 are rotatably mounted on the plates and extend through apertures 15 therein to provide means for feeding the checks through the channel as received from feeding means, not shown, but which may be of any conventional construction. Normally during check sorting, the checks are fed through channel 12 one at a time to be directed to a selected storage bin. When, however, more than one check is fed simultaneously through the guideway in overlapped relation, means is provided to detect the presence or passage of such overlapping items.

In particular accordance with the present invention, such means is provided by pneumatic means which may take other suitable forms but in the preferred embodiment herein illustrated, comprises a pair of oppositely facing sensing or detecting heads 16 and 17 (FIG. 2) aligned with each other on opposite sides of channel 12. The heads are mounted on plates 10 and 11 as by screws 18 with the facing portions 19 of each extending through apertures in the plates with portions inclined inwardly slightly beyond the inner faces of plates 11 and 12.

Figure 9:
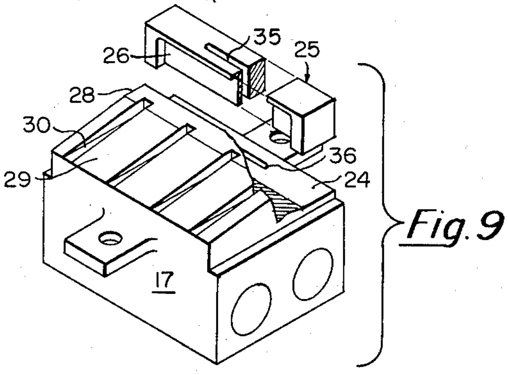
FIG. 9 is an exploded perspective view of one of an air and suction distributing head unit.

Each of the head members are identical in construction except that they are oppositely facing, and include a primary pressure bore or chamber 20 and a suction bore 21. Communicating with the pressure bore 20 are a plurality of secondary or smaller bores 23 which terminate or open into a corner cutout or recess 24 having a corner block 25 suitably secured therein. The corner block includes an elongated recess 26 (FIG. 9) which spans the outlet openings of bores 23, and forms a closed chamber which communicates with a plurality of jets or holes 27 in portion 28 of the heads adjacent the outlet openings of bore 23. It will be seen in FIG. 2, that the jets 27 are disposed substantially parallel to the direction of feed of the checks, with their outlets terminating in slots 30 formed in the face of the heads.

That portion 28 of the heads containing jets 27 projects inwardly of guideway 12 and then tapers outwardly to fair into the guide plates as at 29. The aforementioned jet holes 27 are thus located within guideway 12 and by virtue of the slots 30 are effective to direct airstreams through the guideway parallel to plates 10 and 11.

The aforementioned suction bore 21 communicates with suction slot or port 35 of corner block 25 by means of slot 36 opening into bore 21 of each head. It is observed that the suction ports 35 of the oppositely spaced head members are separated by a distance equal to slightly more than the thickness of two checks.

Referring now to FIG. 1, it is seen that the oppositely disposed suction bores 21 are connected together by conduits 41 and 42 as at 43, and then to a relatively constant suction source 44 by conduit 45. An electric switch 46 at the left side of FIG. 1, sensitive to differential air pressures, is suitably mounted in an enclosure 47. A diaphragm 48 separates the enclosure to form top and bottom chambers and in addition carries the movable switch element 49 which is normally in engagement with stationary contact 50. The upper chamber of the enclosure is subjected to atmospheric pressure while the lower chamber is subjected to suction forces. The lower chamber communicates with suction conduits 41 and 42 and to the suction source 44 by means of conduit 51. The previously referred to electrical contacts 49 and 50 are connected to a machine control 52 by leads 53 and 54 respectively, it being observed that lead 54 includes a current source 55. When the diaphragm 48 is moved to the dotted line position 60, contact 49 is disengaged from contact 50 and thus interrupts the current flow from the source 55 to the machine control 52. The aforementioned movement of diaphragm 48 will occur when both suction ports are simultaneously blocked by the passage of a pair of checks past the reading head in a manner to be more fully described. The machine control may be used to actuate means to direct the checks to a "reject" pocket in the sorter, or to actuate other means indicative of a multiple feed.

Still referring to FIGURE 1, air under pressure is supplied to pressure ports 20 by means of conduits 63 and 64, respectively, which merge as at 65 into a single conduit 66, which in turn is connected to a constant pressure source 67.

In operation, a pair of checks C1, C2 are shown being advanced by rollers 13 through guideway 12 in an upward direction, as shown in FIG. 2. Issuing from the small jets 27 are streams of air flowing in a direction counter to that of the checks. The air streams strike the advancing edges of the checks riffling the same in a manner permitting air to enter between the two inner surfaces 73, 74 of the checks C1, C2, respectively, thus to separate the checks. Upon further advance of the checks to the position shown in FIG. 3, their leading edges ride the inclined surfaces 29. In this position the leading portion of each check is forced outwardly with respect to the other check and toward the head member which includes the air jets 27. This outwardly directing force is produced as a result of the high velocity air moving across the outer surface of the checks producing a pressure field on the outer side of the check lower than the atmospheric pressure on the inner side. The force moreover is greatest as each check is adjacent the jets 27 for in this position the cross sections or apertures or the jets are smallest and therefore the velocity of the air is greatest, hence the low pressure field. The checks thus seek or are forced by the pressure differential to the low pressure field created by the jets and the checks are thus caused to ride the inclined surfaces 29.

As the checks are advanced still further to the relative positions shown in FIG. 4, the leading edge portions of the checks are then subjected to the suction forces adjacent ports 35. Upon simultaneous closure of both oppositely disposed ports 35 by the deflected check portions the flow of air through the pair of conduits 41 (FIG. 1), is cut off and as a consequence the suction forces in conduit 51 are greatly increased with the consequence that diaphragm 48 is deflected to its dotted line position, as shown at 60, within the pressure differential chamber 47. Switch contact 49 is thus disengaged from contact 50 and the normal electric current flow from source 59 through leads 56 and 57 to the machine control unit 51 is interrupted. As before mentioned the unit 51 may be used for various purposes, such as causing the two superimposed checks to be rejected, the apparatus to be stopped, or to establish some other suitable control.

Figure 6:
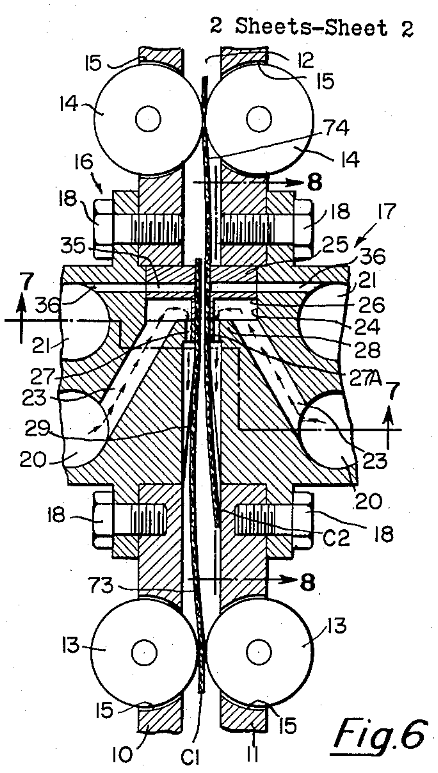
Figure 8:
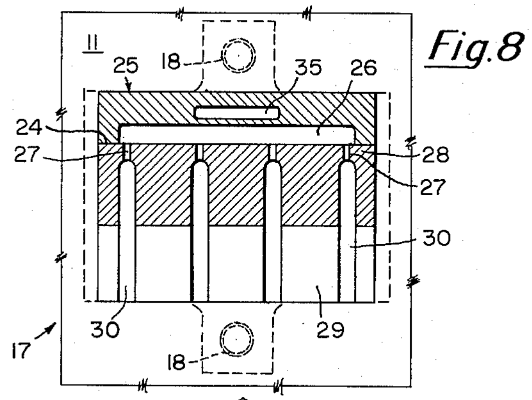
FIG. 8 is a sectional view taken along the line 8—8 of FIG. 6.
Figure 7:
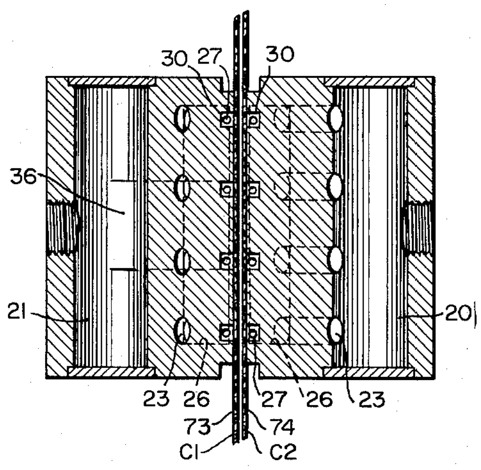
FIG. 7 is a sectional view taken along the line 7—7 of FIG. 6.

FIGS. 5 and 6 show the manner by which a pair of partially overlapping checks are detected in their passage through the guideway 12. Referring first to FIG. 5, the two partially overlapped checks, or items C1 and C2, are illustrated with the leading edge of check C2 in advance of the leading edge of check C1. The air streams travelling in a counter direction from the jet ports 27 cause a layer of air to pass between the leading edge portion of check C1 and the body portion of check C2, thus to laterally deflect the leading edge of check C1 from the body portion of check C2. At the same time the leading edge portion of check C2 is riding the inclined surface 29 by virtue of the low pressure field adjacent its outer face as before described.

As the checks advance to the position shown in FIG. 6, lateral forces are applied to both checks in the same manner as heretofore described thus to maintain the checks separated and against the opposing faces of the heads thus to simultaneously block the opposed suction ports 35 to initiate the control as before described.

While the preferred embodiment of the device has been described in detail for the purposes of illustration it is to be understood that the inventive concept may be embodied in other forms without departing from the scope of the invention.

I claim:

1. Apparatus for detecting documents moving in superimposed relation in a guideway, first and second members spaced to form a guideway for said documents, means for advancing said documents through said guideway, a pair of laterally spaced air flow means, one each mounted in said first and second members, said air flow means each being adapted to emit a stream of air in a direction counter to the direction of advancement of said documents to initially separate the leading edge portions of said documents and upon further advancement thereof to attract said documents laterally toward said air flow means, means for applying suction to said separated portions of said documents upon subsequent advancement thereof whereby said separated portions are effective to obstruct said suction means, and means responsive to the obstruction of said suction means to indicate the presence of said superimposed documents.

2. A device for detecting superimposed planar items advancing edgewise at high speeds comprising, first and second members so positioned so that said items may be transported therebetween, means for advancing said items in a given direction, a pair of airflow means, one each provided in said first and second members and laterally spaced from each other, said pair of air flow means being adapted to emit streams of air flowing in a direction counter to the advancing items to first blow the leading edge portions of said items apart and to thereafter cause each item to be attracted to a different air flow means during subsequent advancement thereof, suction means behind said air flow means in the direction of advancement of said items to thereafter apply suction forces to the outer surfaces of said items whereby said items are forced to obstruct said suction means, and means responsive to the obstruction of said suction means to detect the presence of said superimposed items.

3. A device for sensing multiple items of sheet material comprising, first and second members so positioned that said items may be transported therebetween, means for advancing said items between said members, means for applying a continuous air stream from each said first and second members in a direction counter to the direction of advancement of the items to initially separate the leading edge portions of said items and to thereafter attract said separated portions toward said airstreams, suction means adjacent said air stream means for applying suction forces to the outer surfaces of said separated portion of said items, said suction means including orifices in opposed relation in said first and second members whereby as said separated portions pass said orifices they will simultaneously be drawn to and seal the same, and means responsive to the sealing of said orifices to indicate the presence of multiple items.

4. In a document handling machine a device for detecting superimposed items advancing through said machine, comprising first and second members forming a guideway between which said items are transported, means for continuously transporting said items through said guideway in a given direction, means for directing airstreams through said guideway in a direction counter to the direction of said items to first blow the leading edges of said items apart and thereafter to cause said items to be drawn to opposite sides of said guideway, and means on opposite sides of said guideway to thereafter apply suction forces to said items, whereby said items are effective to obstruct said suction means, and means responsive to the obstruction of said suction means to indicate the presence of said superimposed items.

5. Device for sensing a pair of superimposed items advancing edgewise comprising, first and second plate means defining a guideway for said items, means mounted within said guideway to grip said superimposed items to feed the same continuously along said path, first and second pneumatic head means each mounted oppositely with respect to the other in said plate members and each having a portion extending within said guideway, the portions including pressure jet orifices to which air under pressure may be applied for directing a flow of air counter to the direction of feed of said items to initially separate their leading edge portions and upon further advancement thereof to thereafter cause said items to be attracted to said air pressure orifices, the portions also including opposed suction orifices to which suction may be applied whereby if two items are advanced in overlapped relation they will seal both orifices whereas a single sheet can only seal one of the orifices, a suction-responsive device including diaphragm means connected to said suction orifices and to the source of suction, and switch means associated with said suction responsive device whereby the simultaneous blockage of said suction orifices by said separated items causes movement of said diaphragm means and corresponding actuation of said switch means.

6. In apparatus for detecting the presence of overlapped sheet items including, in combination, a pair of oppositely disposed members defining a guideway for the passage of said sheet items therebetween, means for advancing said sheet items through said guideway, said members including opposed surfaces inclined with respect to the direction of advancement of the items and converging with respect to one another in that direction, and means for emitting jets of air from said inclined surfaces for striking the leading edges of advancing overlapped sheet items whereby the same are separated and outer surface portions thereof are caused to make contact with said converging surfaces during advancing movement thereof.

7. In apparatus for detecting the presence of overlapped sheet items including a pair of members defining a guideway between which said items are passed, said members including opposed surfaces inclined with respect to the direction of advancement of the items and converging with respect to one another in that direction, each of said inclined surfaces having one or more ports adapted to emit streams of air therefrom in a direction generally parallel to and counter to the direction of feed of the items, whereby upon initial advancement of said overlapped items into the guideway said air streams strike the leading edge portions thereof and cause the same to be separated from one another and upon further advancement thereof to engage the inclined surfaces, and with subsequent continuous advancement of the items in the guideway the remaining portions thereof are caused to ride the converging surfaces of said members.

8. In apparatus for normally feeding sheet items one by one, a device for separating overlapped sheet items inadvertently fed therein including, in combination, a pair of oppositely disposed wall members defining a guideway for the passage of sheet items therebetween, means for advancing said sheet items in one direction through the guideways, said members including opposed faces defining a throat through which said items are passed, each of said faces including a portion substantially parallel to the direction of feed of the items and a portion continuous with the parallel portion and inclined inwardly in the direction of feed of the items, said inclined portions of the faces including ports opening thereout for discharging jets of air therefrom in a direction counter to the advancement of the items and parallel to said parallel portions of the faces for striking the leading edges of any advancing overlapped sheet items whereby the same are laterally separated from one another and outer surface areas of the items are caused to make contact with the inclined portions.

9. Apparatus for separating overlapped sheet items comprising, in combination, structure having spaced apart opposed walls defining a throat through which such items are conveyed, said walls of the throat providing corresponding opposed sections substantially parallel to one another and corresponding opposed sections convergingly inclined toward one another, means for advancing sheet items first between the opposed parallel sections of the throat and thence between the opposed converging sections thereof, said inclined sections of the throat having discharge ports therein arranged to direct streams of air therefrom counter to the direction of the advancement of the items through the throat and such that the air streams issuing from each inclined section closely hug the parallel section of its wall, and means for supplying said ports with air under pressure for providing said air streams, the air streams issuing from said ports striking the leading edges of advancing overlapped sheet items as they first enter the throat and causing the sheet items to be laterally separated thereby, and the air streams further creating a differential pressure on opposite sides of such separated sheet items as they further advance into the throat to cause the sheets to ride over the inclined sections of the throat as they advance therethrough.

10. A device for detecting items of sheet material traveling in overlapped relation to one another comprising guide means disposed in spaced parallel arrangement for confining the movement of said items along a predetermined path, means for advancing said items in one direction along said path, a pair of airstream applying means located in the path on opposite sides thereof and arranged to emit streams of air counter to the direction of advancement of the items to strike the leading edge portions thereof, said airstreams causing the overlapped portions of the items to separate by moving transverse to their direction of advancement and each to be attracted toward the airstream applying means on its side of the path, and means responsive to the transverse movement of said items to indicate the presence of said overlapped items.

References Cited in the file of this patent

UNITED STATES PATENTS

| | | |
|---|---|---|
| 1,773,266 | Hallstream | Aug. 19, 1930 |
| 2,063,479 | Belluche | Dec. 8, 1936 |
| 2,615,492 | Holmwood et al. | Oct. 28, 1952 |
| 2,637,552 | Watson | May 5, 1953 |
| 2,729,448 | Backhouse | Jan. 3, 1956 |
| 2,764,410 | Kase et al. | Sept. 25, 1956 |
| 2,812,941 | Tebbs | Nov. 12, 1957 |
| 2,834,166 | Fogwell et al. | May 13, 1958 |